United States Patent [19]

Johnson

[11] 3,762,897
[45] Oct. 2, 1973

[54] THERMOCHEMICAL CLEANING OF GLASS FABRICS

[75] Inventor: James R. Johnson, Greensboro, N.C.

[73] Assignee: Burlington Industries, Inc., Greensboro, N.C.

[22] Filed: Feb. 17, 1972

[21] Appl. No.: 227,243

[52] U.S. Cl............................ 65/3, 65/30, 65/60, 117/126 GF, 134/2
[51] Int. Cl....................... C03c 25/02, C03c 21/00
[58] Field of Search................ 117/126 GF, 46 FA; 65/3, 30, 60; 134/2

[56] References Cited
UNITED STATES PATENTS

| | | | |
|---|---|---|---|
| 2,666,720 | 1/1954 | Balz | 134/2 |
| 3,232,788 | 2/1966 | Marzocchi | 65/3 X |
| 3,375,155 | 3/1968 | Adams | 65/3 X |
| 3,382,135 | 5/1968 | Adams | 65/65 R X |

Primary Examiner—Robert L. Lindsay, Jr.
Attorney—John W. Malley et al.

[57] ABSTRACT

A process for coronizing glass fabric or fibers to remove sizing and/or other thermally sensitive material therefrom and to whiten the glass fabric or fibers is disclosed, wherein the glass fabric or fibers are contacted with at least 0.02 percent by weight of at least one alkali metal azide salt, the thus-treated glass is heated to a temperature of 900° – 1,300° F, producing a cleaned glass fabric or fibers having improved cleanliness and/or tensile properties, compared to similar products treated in the same way but in the absence of the azide salt. The cleaned glass fabric or fibers may be coronized without drying same, while still retaining a substantial amount of the tensile properties thereof, which is a substantial improvement over prior art processes which generally require an intermediate drying step.

9 Claims, No Drawings

THERMOCHEMICAL CLEANING OF GLASS FABRICS

BACKGROUND OF THE PRIOR ART

The art has been concerned with heat-cleaning fibrous glass substrates for some time, seeking a process for heat-cleaning fibrous glass in a manner to minimize strength loss while giving a good white color to the cleaned glass.

Glass fibers are conventionally given a coating of sizing on the surface thereof as soon after the fiber spinning as possible in order to protect the glass fibers. The fibers, with the sizing coating thereon, are then woven or otherwise fabricated into a fabric form, with the sizing serving to protect the fibers during such fabrication. The sizing is a temporary sizing which must be removed from the glass fibers prior to dyeing and/or finishing.

The conventional method of removing sizing from fibrous glass substrates involves treatment at elevated temperatures, with such high temperatures resulting in the removal of thermally sensitive compounds, such as the sizing material, lubricating oils, and the like, from the fibers. However, if such cleaning is conducted for a time sufficient to reach an acceptable white color of the glass fiber, an appreciable degradation of the fiber strength will be noted.

U. S. Pat. No. 3,375,155 discloses a process for heat cleaning fibrous glass by treating the glass with a compound having a sodium, potassium, cesium or rubidium cation and an anion which is decomposable by heat to provide oxygen. The fibrous glass is dried and then heated to a temperature of 600° – 1,250° F to remove the sizing material therefrom. Preferred anions include the nitrate and the chlorate.

U. S. Pat. No. 2,666,720 discloses a process for removal of oil-starch binder material from glass cloth by soaking the glass cloth in a water solution of urea to remove the starch of the binder composition, and thereafter heating the cloth at a temperature of about 1,200° F to remove the oil constituents of the binder composition from the glass cloth. The glass cloth is dried between the urea solution treatment step and the high-temperature treatment step to remove the oil. This patent discloses treating the glass cloth, containing the oil, with a strong alkali such as sodium hydroxide prior to the burning step.

U. S. Pat. No. 2,674,549 discloses a process for cleaning glass cloth by first treating the glass cloth with a strong chlorate solution and then subjecting the cloth to a low temperature heating step, in the order of 650° – 750° F, to remove the binder from the cloth. In this instance, the cloth is subjected to the heating step while still wet with the chlorate solution. This process has been indicated by the art to result in excessive loss of fabric strength, and also requiring, in some instances, an after treatment of bleach to achieve an acceptable white color (See U. S. Pat. No. 3,375,155 acknowledged above, column 2, lines 24 – 37).

British Pat. No. 1,180,993 discloses a method of heat cleaning fibrous glass by treating the glass with a compound having an anion decomposable by heat to provide oxygen and the combination of a sodium cation and a second cation which is potassium, cesium or rubidium ion. The treated glass is dried and then subjected to a temperature of 600° F – 1,250° F to remove substantially all sizing material therefrom. The anion may suitable be nitrate or chlorate.

U. S. Pat. No. 3,382,135 indicates that when coronizing fibrous glass material in the presence of a salt having a potassium, cesium or rubidium cation, and a thermally decomposable oxygen-containing anion, at temperatures of 1000°F and above, the tensile strength of the treated fibrous glass dropped significantly over that obtained at less efficient lower process temperatures. The patent proposes a process for treating a glass fabric containing replaceable sodium cations by treating same with a compound containing a cation of Group II-A and III-B of the Mendeleef Periodic Table, preferably calcium, barium, strontium, lanthanum, and mixtures thereof, and an anion which is an oxygen-containing radical which produces oxygen on heating at elevated temperatures, such as the nitrate or chlorate. The glass fabric is dried and then heated at a temperature of 600° F to 1,300° F.

It will be appreciated that all of the above prior art processes, except for the process described in U. S. Pat. No. 2,674,549, dry the treated glass fabric disclosed therein prior to the heating, or coronizing step, and the process of the aforesaid U. S. Pat. No. 2,674,549 has been criticized by the prior art.

SUMMARY OF THE INVENTION

The present invention is directed to a process for coronizing fibrous glass, such as glass fabric, to produce a product which has excellent strength retention and cleanliness. The fibrous glass is treated with an alkali metal azide salt and thereafter, while either wet or after being dried, is heated to a coronizing temperature until substantially all thermally sensitive materials have been removed therefrom. The resulting fibrous glass product is much cleaner and has improved tensile properties as compared to similar coronized fibrous glass products, wherein the coronization step was in the absence of the azide salt.

DETAILED DESCRIPTION OF THE INVENTION

The present invention is directed to the treatment of fibrous glass to improve the thermal and tensile properties thereof. The term "fibrous glass," as used herein, refers to fibers, fabrics, yarns, threads, ends, rovings, and filaments, or any other fiber form used in the preparation of textiles, in contrast to massive, cast glass or other non-fibrous glass material which has little or no application in the fabrication of fabrics or textiles.

The fibrous glass treated herein may be of any conventional composition. Typically suitable fibers are those made from glass of the following approximate composition in parts by weight:

| | |
|---|---|
| Silicon dioxide | 52–56 |
| Calcium oxide | 16–25 |
| Aluminum oxide | 12–16 |
| Boron oxide | 8–13 |
| $Na_2O$ | 0–1 |
| Magnesium oxide | 0–6 |

A fibrous glass substrate, such as glass fabric or glass fibers, which has thereon a thermally sensitive material, such as a sizing binder or a lubricating oil, is contacted with at least 0.02 percent by weight, based on the weight of said fibrous glass, of at least one alkali metal azide salt. Thereafter, the fibrous glass substrate, treated with said azide salt, is heated to a temperature of about 900° F to about 1,300° F until substantially all thermally sensitive materials have been removed therefrom. Generally, substantially all sizing material will have been removed when the ignition loss is 0.1 percent by weight or less.

The alkali metal azide salt is an azide salt of sodium, potassium, lithium, cesium, rubidium or the like, although sodium azide and potassium azide are preferred. The alkali metal azide salt is applied to the fibrous glass by conventional methods, including padding, dipping, spraying and the like, although for most textile operations padding will be preferred. At least 0.02 percent by weight of the alkali metal azide salt (dry basis) is applied to the fibrous glass, although the amount of azide salt can range up to 2 percent by weight, based on the weight of the fibrous glass, or even higher. The amount of azide salt used will depend to some extent upon the particular azide salt chosen. Preferably, the fibrous glass is contacted with about 0.05 to 0.1 percent by weight of the azide salt, more preferably about 0.1 percent by weight of the azide salt. The azide salt is conveniently applied to the fibrous glass in the form of an aqueous solution containing about 0.06 to about 2.0 percent by weight of said azide salt, preferably about 0.15 to 1.5 percent by weight of azide salt, although higher or lower concentrations may be used, i.e., 0.02 to 6 percent by weight of azide salt. The temperature of the step of contacting the fibrous glass with the azide salt is not critical, and ambient temperature is preferred, although higher or lower temperatures may be used as desired.

After the alkali metal azide salt is applied to the fibrous glass, the treated fibrous glass is subjected to a heating step at a temperature of about 900° to about 1,300° F until substantially all thermally sensitive materials have been removed therefrom. After the treating step and before the heating step, the treated fibrous glass may be dried, if desired, although one of the major advantages of the process of the present invention is that the treated fibrous glass need not be dried prior to the heating step, but can still be wet by the alkali metal azide salt solution when subjected to the heating step. If the treated fibrous glass is dried prior to the heating step, the drying may be at slightly elevated temperatures, and/or reduced pressures, if desired, although ambient drying conditions are acceptable. Obviously, the treated fibrous glass may be dried, if desired, under conditions of relative humidity less than ambient humidity.

While it is most convenient to apply the alkali metal azide salt to glass fabrics, the azide salt can be applied at any stage of fabric manufacture prior to heat cleaning. The azide salt can be applied to fibers, yarns, rovings and the like, or any other fibrous glass, which, in contrast to massive or cast glass, can be made into fabrics.

The heating step time is not critical and is generally dependent upon the heating temperature and the end use to which the product is to be put. Broadly, the heating time can range from fractions of a second to a day or even more, although generally the heat treatment time will vary between about a second and several hours, e.g., three hours or less.

The apparatus used in the heating step is not important as any suitable heating device, such as ovens, furnaces, and the like, can effectively be used, including forced air ovens, muffle furnaces, etc.

EXAMPLES OF THE INVENTION

In the following examples, the cleanliness of the samples was measured in terms of degree of whiteness, as determined from reflectance measurements on a Hunter Reflectometer, Model D-40.

Four thicknesses of samples were used, as it was found necessary to have such thickness to insure no penetration of light through the samples. The Hunter Reflectometer was calibrated with a permanent standard consisting of a plate having a white porcelain enamel coating thereon. The degree of whiteness was calculated, after obtaining readings using blue and green filters, by the formula:

Degree of whiteness = (4xBlue) − (3xGreen)

The creased tensile strengths relate to measurements made after taking a folded strip (1 inch wide) and rolling a 4 lb. weight over the sample 5 times while placed on an inclined plane.

EXAMPLE 1

A glass fabric made of 54 ends of ECDE 150 ½ and 16 picks of Taslan texturized type ECDE 75 1/0 glass fibers was treated with differing concentrations of aqueous potassium azide and sodium azide salt solutions. In each case, the wet pickup was approximately 100 percent — that is the weight of the solution was about that of the weight of the glass fabric. The control samples were prepared and treated in an identical manner, except that water was substituted in lieu of the aqueous azide salt solutions. After the pretreatment, certain indicated samples were air dried (ambient conditions) prior to the heat cleaning treatment, whereas the other samples were heat cleaned while still wet with the azide salt solution. The heat cleaning step consisted of heating the samples for the indicated times in an oven maintained at the indicated temperature. As the wet pickup was 100 percent, the dry pickup values corresponded to the salt concentrations. The results are set forth in Table 1 below.

TABLE I

| Sample No. | Treatment | Bath Conc.* (wt. %) | Heat Cleaning Time (sec.) | Heat Cleaning Temp (°F) | Degree of Whiteness |
|---|---|---|---|---|---|
| 1 | Control | — | 10 | 1100 | 51.0 |
| 2 | KN$_3$ | 0.035 | 10 | 1100 | 53.0 |
| 3 | KN$_3$ | 0.10 | 10 | 1100 | 61.0 |
| 4 | NaN$_3$ | 0.10 | 10 | 1100 | 61.6 |
| 5 | NaN$_3$ | 0.50 | 10 | 1100 | 64.8 |
| 6 | Control (dry) | — | 10 | 1100 | 66.7 |
| 7 | KN$_3$ (dry) | 0.10 | 10 | 1100 | 69.2 |
| 8 | NaN$_3$ (dry) | 0.10 | 10 | 1100 | 67.6 |
| 9 | Greige | — | — | — | 62.2 |

*Also dry pickup, wt. %

From the results set forth in Table 1, it will be appreciated that sample pretreatment with either potassium azide or sodium azide resulted in a substantial improvement in the degree of whiteness of the cleaned samples, with the degree of whiteness being dependent upon the salt bath concentration. The greatest relative improvement in whiteness occurred on samples which were heat cleaned while still wet, especially at a bath concentration of 0.10 weight percent or greater.

EXAMPLE 2

This example relates to the pretreatment of a glass fabric made of 54 ends of ECDE 150 1/0 and 18 picks of Taslan texturized ECDE 100 1/0 glass fibers, with aqueous solutions of sodium azide, with a subsequent heat cleaning treatment while the fabric was still wet with the sodium azide solution. The concentration of the sodium azide was 0.1 percent by weight (94.4g per 25 gallons of water). The wet weight pickup was approximately 37 percent, consequently, the fabric had dry add-ons of approximately 0.037 percent.

The heat cleaning treatment consisted of passing the treated fabric, still wet, continuously through 3 10-foot heating zones, having the indicated temperatures therein (the temperatures are indicated in the respective zones in the order of glass fabric travel) at 60 yards per minutes.

The degree of whiteness was determined prior to the addition of any finish to the fabric. The samples were finished with about 5 percent by weight, based on the weight of the fabric, of a standard acrylate latex. *

*The formula for the aqueous acrylate latex was:

| | wt. % |
|---|---|
| Ethyl acrylate/hexyl acrylate (4/1) acrylic latex | 8.0 |
| Urea-modified acrylic latex | 1.0 |
| Coupling agent C-600 (Dow Corning) $CH_3OOC(CH_2)_2 NH(CH_2)_2 NH(CH_2)_3 Si(OCH_3)_3$ | 0.3 |
| Epoxidized soybean oil softener | 0.3 |
| Delustrant, $TiO_2$ | 5.0 |

Then the original and creased textile strengths were obtained, according to ASTM-D579-49, with the results reported in pounds per inch width. The tensiles were also obtained after laundering the samples in a 0.07 percent w/v aqueous detergent solution.

The results obtained in this example are reported in Table 2 below.

TABLE II

| Sample number: | Treatment | Heating zone temps.,° F. | Tensiles (lb./in.) (before washing) Original, W x F | Creased, W x F | Tensiles (lb./in.) (after washing) Original, W x F | Creased, W x F | Whiteness |
|---|---|---|---|---|---|---|---|
| 1 | Control | 1,150/1,150/1,150 | 116 x 22 | 103 x 21 | 110 x 9 | 99 x 9 | 40.0 |
| 2 | 0.1% NaN₃ | 1,150/1,150/1,150 | 153 x 34 | 130 x 49 | 121 x 34 | 117 x 36 | 43.2 |
| 3 | Control | 1,200/1,250/1,250 | 85 x 25 | 81 x 25 | 80 x 26 | 68 x 22 | 41.9 |
| 4 | 0.1% NaN₃ | 1,200/1,250/1,250 | 83 x 20 | 74 x 24 | 88 x 20 | 86 x 20 | 51.6 |
| 5 | Control | 1,200/1,300/1,300 | 87 x 17 | 86 x 17 | 75 x 7 | 76 x 8 | 38.0 |
| 6 | 0.1% NaN₃ | 1,200/1,300/1,300 | 99 x 22 | 95 x 18 | 80 x 21 | 84 x 11 | 60.5 |
| 7 | Control (dry) | 1,200/1,300/1,300 | 128 x 32 | 129 x 31 | 109x 26 | 109 x 25 | 50.1 |
| 8 | Greige | | 199 x 56 | 190 x 57 | | | 62.5 |

As will be appreciated from Table 2 above, the pretreatment with sodium azide produced much cleaner whiter samples than the controls. In most cases, the tensile strengths of the sodium azide treated fabrics were improved over those of the controls, and in no case were the tensile strengths significantly lowered by the sodium azide treatment.

EXAMPLE 3

Various samples of the fabric used in Example 2 were padded with an aqueous solution containing 0.1 percent by weight of sodium azide, using the padding conditions of Example 2. The wet pickup was 37 percent by weight of the fabric, resulting in a dry pickup of the sodium azide of 0.037 percent, based on the weight of the fabric. The treated fabric was then heat-cleaned, under wet or dry conditions, as set forth in the table below, using coronizing conditions similar to those described in Example 2, and the results are set forth in Table III below:

TABLE III

| Sample No. | Condition of Fabric | Straight Tensile (lbs./in.) W × F | Creased Tensile (lb./in.) W × F | Degree of Whiteness | Temp. of Heating Zones (°F) |
|---|---|---|---|---|---|
| 1 | Wet | 121×28 | 91×19 | 42.9 | 1135/1167/1350 |
| 2 | Wet | 89×26 | 70×15 | 51.7 | 1110/1307/1300 |
| 3 | Wet | 82×29 | 57×19 | 51.4 | 1128/1335/1350 |
| 4 | Dry | 81×30 | 73×18 | 52.0 | 1115/1285/1335 |
| 5 | Dry | 111×28 | 81×21 | 45.6 | 915/1155/1390 |
| 6 | Dry | 95×17 | 64×15 | 48.6 | 1100/1290/1380 |

EXAMPLE 4

Example 2 was repeated, using a textured fabric made of 54 ends of ECDE 150 1/0 and 18 picks of Taslan — textured ECDE 75 1/0 glass fibers. The fabric was treated with varying amounts of sodium and/or potassium azide, using bath concentrations set forth below. The wet pickup of the azide salt solution was 37 percent by weight of the fabric. In each case the fabric was dried prior to coronization. Immediately after the coronizing step, the fabric samples were washed in a 2 percent acetic acid solution, rinsed with water, dried at ambient conditions, and then finished with the acrylic latex used in Example 2. The degree of whiteness was determined after the samples were finished, and the values obtained were not as high numerically as those reported in the other working examples, as the delustrant in the finish composition reduced the whiteness.

The results of the evaluation of the samples are set forth in Table 4 below:

TABLE IV

| Sample number: | Bath conc., wt. percent | Dry add-on, wt. percent | Straight tensile (lbs./in.) W x F | Creased tensile (lb./in.) W x F | Degree of whiteness | Temperature of heating zones (° F.) |
|---|---|---|---|---|---|---|
| 1 | 0.0609 NaN₃ | 0.26 | 123 x 18 | 122 x 18 | 19.0 | 1,000/1,000/1,000 |
| 2 | 0.128 NaN₃ | 0.051 | 122 x 24 | 122 x 25 | 24.0 | 1,000/1,000/1,000 |
| 3 | 0.277 NaN₃ | 0.103 | 114 x 19 | 113 x 17 | 31.8 | 1,000/1,000/1,000 |
| 4 | 0.138 NaN₃ | 0.051 | 104 x 16 | 102 x 14 | 44.0 | 1,060/1,115/1,115 |
| 5 | 0.277 NaN₃ | 0.103 | 110 x 14 | 106 x 14 | 36.6 | 1,060/1,115/1,115 |
| 6 | 0.138 KN₃ | 0.051 | 120 x 20 | 119 x 19 | 37.5 | 1,000/1,000/1,000 |
| 7 | 0.138 NaN₃ plus 0.138 KN₃ | 0.102 | 118 x 20 | 117 x 19 | 40.8 | 1,000/1,000/1,000 |
| 8 | Control | | 128 x 34 | 128 x 34 | 28.0 | 1,060/1,115/1,115 |
| 9 | Greige | | 192 x 65 | 183 x 67 | 65.3 | |

From the above results, it will be appreciated that it is preferred to utilize a temperature of at least 1,100° F in at least one of the heating zones, and to use a dry add-on of at least 0.05 percent by weight. It is preferred that the degree of whiteness in the above test be at least 40.

EXAMPLE 5

Example 1 was repeated, using an industrial type fabric having a weight of 5.8 oz/sq. yd, made of 42 ends and 32 picks of ECDE 75 1/0 glass fibers. This fabric was pretreated with aqueous solutions of sodium azide, using solution concentrations set forth below. The samples were air dried (at ambient conditions) and then heat cleaned for 10 seconds at the indicated temperature. The results are set forth in Table 5 below.

TABLE V

| Sample No. | Treatment | Bath Conc. (Wt. %) | Heat Cleaning Temp (°F) | Degree of Whiteness |
|---|---|---|---|---|
| 1 | Control | — | 900 | 40.1 |
| 2 | $NaN_3$ | 0.1 | 900 | 53.1 |
| 3 | $NaN_3$ | 0.5 | 900 | 56.3 |
| 4 | Control | — | 1000 | 58.2 |
| 5 | $NaN_3$ | 0.1 | 1000 | 60.4 |
| 6 | $NaN_3$ | 0.5 | 1000 | 64.0 |

It will be noted that the cleanliness of the sodium azide-treated samples, as determined by the reflectance measurements, was considerably better than the controls.

It will be appreciated that the references to "W × F" in connection with the tensile strength values given in Tables II, III and IV stand for warp (W) and filling (F) values.

What is claimed:

1. A process for coronizing fibrous glass having thermally sensitive material thereon to remove said thermally sensitive material from and to whiten said glass, said process comprising contacting said glass with at least 0.02 percent by weight of at least one alkali metal azide salt selected from the group consisting of sodium azide and potassium azide, and thereafter heating the said glass treated with said azide salt to a temperature of about 900° to about 1,300° F until substantially all thermally sensitive materials have been removed from said glass, whereby the coronized fibrous glass exhibits improved cleanliness and/or tensile properties, compared to fibrous glass heated to said temperature in the absence of said azide salt.

2. The process as claimed in claim 1, wherein glass is contacted with about 0.05 to about 2.0 percent by weight, based on the weight of said glass, of said azide salt.

3. The process as claimed in claim 2, wherein said glass is contacted with about 0.05 to about 0.1 percent by weight of said azide salt.

4. The process as claimed in claim 3, wherein said glass is contacted with about 0.1 percent by weight of said azide salt.

5. The process as claimed in claim 1, wherein said fibrous glass is glass fabric.

6. Th process as The in claim 1 wherein said salt is sodium azide.

7. The process as claimed in claim 5, wherein the treated glass fabric is heated without drying same.

8. The process as claimed in claim 5, wherein said fabric is dried to remove substantially all moisture therefrom after treatment with said azide salt and before said heating step.

9. The process as claimed in claim 1, wherein said glass is contacted with an aqueous solution of said azide salt, and thereafter is heated to said temperature without drying same prior to said heating step.

* * * * *

UNITED STATES PATENT OFFICE
CERTIFICATE OF CORRECTION

Patent No. 3,762,897    Dated October 2, 1973

Inventor(s) James R. Johnson

It is certified that error appears in the above-identified patent and that said Letters Patent are hereby corrected as shown below:

Col. 1, line 67: "suitable" should be "suitably".

Claim 6 should read: "The process as claimed in claim 1 wherein said salt is sodium azide."

Signed and sealed this 16th day of April 1974.

(SEAL)
Attest:

EDWARD M. FLETCHER, JR.
Attesting Officer

C. MARSHALL DANN
Commissioner of Patents